(12) United States Patent
Speece

(10) Patent No.: US 7,566,397 B2
(45) Date of Patent: Jul. 28, 2009

(54) SUPEROXYGENATION OF RAW WASTEWATER FOR ODOR/CORROSION CONTROL

(75) Inventor: Richard E. Speece, Nashville, TN (US)

(73) Assignee: Eco Oxygen Technologies, LLC, Indianapolis, IN (US)

(*) Notice: Subject to any disclaimer, the term of this patent is extended or adjusted under 35 U.S.C. 154(b) by 271 days.

(21) Appl. No.: 11/053,124

(22) Filed: Feb. 8, 2005

(65) Prior Publication Data

US 2005/0173326 A1    Aug. 11, 2005

Related U.S. Application Data

(60) Provisional application No. 60/543,097, filed on Feb. 9, 2004.

(51) Int. Cl.
    *C02F 1/72* (2006.01)
(52) U.S. Cl. .................. 210/205; 261/34.1; 261/74; 261/76; 261/DIG. 70
(58) Field of Classification Search ............ 210/170.08, 210/172.1, 198.1, 205; 261/34.1, 74, 76, 261/DIG. 70
    See application file for complete search history.

(56) References Cited

U.S. PATENT DOCUMENTS

| | | |
|---|---|---|
| 1,439,406 A | 12/1922 | Elrod |
| 1,863,111 A | 6/1932 | Greve |
| 1,963,354 A | 6/1934 | Currie |
| 2,788,127 A | 4/1957 | Davidson |
| 3,201,919 A | 8/1965 | Long |
| 3,335,082 A | 8/1967 | Ullrich |
| 3,484,836 A | 12/1969 | Welch |
| 3,525,685 A | 8/1970 | Edwards |
| 3,607,735 A | 9/1971 | Hover et al. |
| 3,614,256 A | 10/1971 | Sieghartner |
| 3,617,537 A | 11/1971 | Vermette |
| 3,643,403 A | 2/1972 | Speece |
| 3,677,936 A | 7/1972 | Bastiaanse |
| 3,734,850 A | 5/1973 | Karr |

(Continued)

FOREIGN PATENT DOCUMENTS

DE           3430924 A1    2/1986

(Continued)

OTHER PUBLICATIONS

W. Wesley Eckenfelder, Jr, Principles of Water Quality Management, published 1980, CBI Publishing Co., Inc., pp. 179-182.*

(Continued)

*Primary Examiner*—Matthew O Savage
(74) *Attorney, Agent, or Firm*—Ice Miller LLP; Natalie J. Dean; William Lyon

(57) ABSTRACT

A system and method for inhibiting and precluding the buildup and offgas of offensive odors and corrosive sulfuric acid in wastewater in a variety of locations in a sewage system through the use of superoxygenation. The system comprises an oxygenator having an inverse conical section for a downward flow of oxygen gas injected into the sewage stream prior to entering the oxygenator. In one embodiment, the system is inserted directly into the main sewage stream, while in another embodiment, the system is used to treat a sidestream from the main sewage stream.

10 Claims, 1 Drawing Sheet

U.S. PATENT DOCUMENTS

| | | | |
|---|---|---|---|
| 3,737,382 A | 6/1973 | Fletcher et al. |
| 3,738,620 A | 6/1973 | Ennis |
| 3,756,197 A | 9/1973 | Buss et al. |
| 3,758,083 A | 9/1973 | Palmer |
| 3,772,187 A | 11/1973 | Othmer |
| 3,778,233 A | 12/1973 | Blough et al. |
| 3,779,913 A | 12/1973 | Martin |
| 3,794,303 A | 2/1974 | Hirshon |
| 3,804,255 A | 4/1974 | Speece |
| 3,815,879 A | 6/1974 | Mikhailov et al. |
| 3,826,742 A | 7/1974 | Kirk et al. |
| 3,840,457 A | 10/1974 | Wilson |
| 3,875,051 A | 4/1975 | Kovarik |
| 3,926,588 A | 12/1975 | Speece |
| 3,927,152 A | 12/1975 | Kyrias |
| 3,947,359 A | 3/1976 | Laurie |
| 3,953,554 A | 4/1976 | Loughridge |
| 3,956,124 A | 5/1976 | Fast et al. |
| 3,957,633 A | 5/1976 | Gatti et al. |
| 3,959,142 A | 5/1976 | Dupre |
| 3,981,273 A | 9/1976 | Buss |
| 3,984,323 A | 10/1976 | Evens |
| 3,992,491 A | 11/1976 | Ihrig et al. |
| 4,039,437 A | 8/1977 | Smith et al. |
| 4,044,720 A | 8/1977 | Fast |
| 4,048,072 A | 9/1977 | McCullough |
| 4,064,750 A | 12/1977 | Speece |
| 4,087,262 A | 5/1978 | Speece |
| 4,094,774 A | 6/1978 | Smith |
| 4,102,650 A | 7/1978 | Spevack |
| 4,115,258 A | 9/1978 | Smith et al. |
| 4,126,544 A | 11/1978 | Baensch et al. |
| 4,133,850 A | 1/1979 | Hauser |
| 4,146,478 A | 3/1979 | Rongved |
| 4,148,726 A | 4/1979 | Smith |
| 4,157,304 A | 6/1979 | Molvar |
| 4,171,263 A | 10/1979 | Roberts, Jr. et al. |
| 4,179,375 A | 12/1979 | Smith |
| 4,183,787 A | 1/1980 | Roesler et al. |
| 4,203,841 A | 5/1980 | Shimizu et al. |
| 4,210,534 A | 7/1980 | Molvar |
| 4,213,923 A | 7/1980 | Bryson |
| 4,224,158 A | 9/1980 | Molvar |
| 4,226,717 A | 10/1980 | Malm |
| 4,226,719 A | 10/1980 | Woltman |
| 4,235,719 A | 11/1980 | Pearson |
| 4,244,821 A | 1/1981 | Molvar |
| 4,248,707 A | 2/1981 | Granger |
| 4,251,365 A | 2/1981 | Speece |
| 4,278,546 A | 7/1981 | Roesler |
| 4,287,070 A | 9/1981 | Pollock |
| 4,304,665 A | 12/1981 | Hines |
| 4,344,774 A | 8/1982 | Skipper |
| 4,347,143 A | 8/1982 | Righetti |
| 4,350,589 A | 9/1982 | Stog |
| 4,351,730 A | 9/1982 | Bailey et al. |
| 4,368,121 A | 1/1983 | Vasiliev et al. |
| 4,415,508 A | 11/1983 | Aida et al. |
| 4,421,648 A | 12/1983 | Besik |
| 4,451,213 A | 5/1984 | Takei et al. |
| 4,474,713 A | 10/1984 | Wickoren |
| 4,504,388 A | 3/1985 | Desbos et al. |
| 4,508,492 A | 4/1985 | Kusakawa et al. |
| 4,545,945 A | 10/1985 | Prave et al. |
| 4,581,137 A | 4/1986 | Edwards |
| 4,587,064 A | 5/1986 | Blum |
| 4,650,404 A | 3/1987 | Kusakawa |
| 4,659,485 A | 4/1987 | Arbisi et al. |
| 4,690,756 A | 9/1987 | Van Ry |
| 4,695,378 A | 9/1987 | Ackman et al. |
| 4,704,204 A | 11/1987 | Kaelin |
| 4,724,086 A | 2/1988 | Kortmann |
| 4,724,677 A | 2/1988 | Foster |
| 4,732,682 A | 3/1988 | Rymal |
| 4,749,493 A | 6/1988 | Hicks |
| 4,749,527 A | 6/1988 | Rasmusen |
| 4,786,419 A | 11/1988 | Mouratoglu et al. |
| 4,790,355 A | 12/1988 | Kennedy |
| 4,793,919 A | 12/1988 | McCorquodale |
| 4,797,208 A | 1/1989 | Miller et al. |
| 4,820,412 A | 4/1989 | Meyer-Rudolphi et al. |
| 4,857,350 A | 8/1989 | Iwasaki et al. |
| 4,863,643 A | 9/1989 | Cochran |
| 4,863,644 A | 9/1989 | Harrington et al. |
| 4,867,918 A | 9/1989 | Kiyonaga et al. |
| 4,885,084 A | 12/1989 | Doyle |
| 4,906,359 A | 3/1990 | Cox, Jr. |
| 4,911,838 A | 3/1990 | Tanaka |
| 4,911,843 A | 3/1990 | Hunniford et al. |
| 4,911,849 A | 3/1990 | Labesque et al. |
| 4,919,814 A | 4/1990 | Carnahan et al. |
| 4,930,993 A | 6/1990 | Han et al. |
| 4,931,225 A | 6/1990 | Cheng |
| 4,940,539 A | 7/1990 | Weber |
| 4,956,080 A | 9/1990 | Josefik |
| 4,961,400 A | 10/1990 | Lapray |
| 4,965,022 A | 10/1990 | Litz |
| 5,011,369 A | 4/1991 | Mine et al. |
| 5,013,429 A | 5/1991 | Krofta |
| 5,013,441 A | 5/1991 | Goronszy |
| 5,045,202 A | 9/1991 | Stearns et al. |
| 5,057,230 A | 10/1991 | Race |
| 5,080,802 A | 1/1992 | Cairo, Jr. et al. |
| 5,084,167 A | 1/1992 | Beard et al. |
| 5,087,377 A | 2/1992 | Josefik |
| 5,096,386 A | 3/1992 | Kassel |
| 5,110,741 A | 5/1992 | Ohi et al. |
| 5,116,501 A | 5/1992 | House |
| 5,116,506 A | 5/1992 | Williamson et al. |
| 5,118,415 A | 6/1992 | Weis et al. |
| 5,133,876 A | 7/1992 | Tharp |
| 5,152,888 A | 10/1992 | Koyama |
| 5,160,459 A | 11/1992 | Guarnaschelli et al. |
| 5,167,806 A | 12/1992 | Wang et al. |
| 5,167,878 A | 12/1992 | Arbisi et al. |
| 5,185,085 A | 2/1993 | Borgren |
| 5,194,144 A | 3/1993 | Blough |
| 5,200,080 A | 4/1993 | Bergman, Jr. et al. |
| 5,211,916 A | 5/1993 | Cheng |
| 5,238,253 A | 8/1993 | Sieghartner |
| 5,252,229 A | 10/1993 | Rojey et al. |
| 5,256,282 A | 10/1993 | Chang et al. |
| 5,262,051 A | 11/1993 | Iwatsuka |
| 5,264,130 A | 11/1993 | Etlin |
| 5,294,340 A | 3/1994 | Stog |
| 5,302,286 A | 4/1994 | Semprini et al. |
| 5,314,621 A | 5/1994 | Rogalla |
| 5,330,639 A | 7/1994 | Murphree |
| 5,332,502 A | 7/1994 | Wickens et al. |
| 5,352,369 A | 10/1994 | Heinig, Jr. |
| 5,356,600 A | 10/1994 | Kiyonaga et al. |
| 5,362,400 A | 11/1994 | Martinell |
| 5,380,471 A | 1/1995 | Ban et al. |
| 5,391,328 A | 2/1995 | Ott |
| 5,403,522 A | 4/1995 | Von Berg |
| 5,423,979 A | 6/1995 | Allen |
| 5,437,784 A | 8/1995 | Meinecke et al. |
| 5,463,176 A | 10/1995 | Eckert |
| 5,463,879 A | 11/1995 | Jones |
| 5,494,583 A | 2/1996 | Dieter |
| 5,494,589 A | 2/1996 | Moorehead et al. |
| 5,496,505 A | 3/1996 | Walla et al. |
| 5,520,818 A | 5/1996 | Smith et al. |
| 5,525,242 A | 6/1996 | Kerecz |

| | | |
|---|---|---|
| 5,543,089 A | 8/1996 | Pichardo |
| 5,569,416 A | 10/1996 | Cross |
| 5,578,211 A | 11/1996 | Dickerson |
| 5,580,463 A | 12/1996 | Hubred |
| 5,590,551 A | 1/1997 | Hong |
| 5,591,001 A | 1/1997 | Ray et al. |
| 5,595,691 A | 1/1997 | Hsu |
| 5,624,565 A | 4/1997 | Lefevre et al. |
| 5,639,371 A | 6/1997 | Loy et al. |
| 5,662,837 A | 9/1997 | Saito et al. |
| 5,741,443 A | 4/1998 | Gemza |
| 5,755,091 A | 5/1998 | Johnson |
| 5,772,886 A | 6/1998 | Bettle |
| 5,783,118 A | 7/1998 | Kolaini |
| 5,784,885 A | 7/1998 | Ishihama et al. |
| 5,785,854 A | 7/1998 | McKinney |
| 5,798,044 A | 8/1998 | Strohmeier et al. |
| 5,807,484 A | 9/1998 | Couture et al. |
| 5,814,222 A | 9/1998 | Zelenak et al. |
| 5,819,524 A | 10/1998 | Bosley et al. |
| 5,861,095 A | 1/1999 | Vogel et al. |
| 5,863,031 A | 1/1999 | Veeder et al. |
| 5,874,001 A | 2/1999 | Carter |
| 5,876,639 A | 3/1999 | Campau |
| 5,885,466 A | 3/1999 | Kelly |
| 5,904,851 A | 5/1999 | Taylor et al. |
| 5,935,490 A | 8/1999 | Archbold et al. |
| 5,948,326 A | 9/1999 | Pate |
| 5,951,922 A | 9/1999 | Mazzei |
| 5,968,352 A | 10/1999 | Ditzler |
| 5,988,601 A | 11/1999 | Burgess |
| 6,017,020 A | 1/2000 | Baughman et al. |
| 6,032,931 A | 3/2000 | Plunkett |
| 6,033,576 A | 3/2000 | Russo |
| 6,036,749 A | 3/2000 | Ribeiro et al. |
| 6,050,550 A | 4/2000 | Burgess |
| 6,059,537 A | 5/2000 | Cygnor |
| 6,066,193 A | 5/2000 | Lee |
| 6,103,123 A | 8/2000 | Gantzer |
| 6,113,675 A | 9/2000 | Branstetter |
| 6,120,008 A * | 9/2000 | Littman et al. ............ 261/76 |
| 6,161,467 A | 12/2000 | A'Hearn et al. |
| 6,223,540 B1 | 5/2001 | Egermeier |
| 6,237,898 B1 | 5/2001 | Lafont |
| 6,254,667 B1 | 7/2001 | Saito et al. |
| 6,280,157 B1 | 8/2001 | Cooper |
| 6,284,133 B1 | 9/2001 | Schaefer et al. |
| 6,284,138 B1 | 9/2001 | Mast |
| 6,322,055 B1 | 11/2001 | Speece |
| 6,413,418 B2 * | 7/2002 | Brahmbhatt et al. ..... 210/195.1 |
| 2001/0018026 A1 | 8/2001 | Lampe et al. |

FOREIGN PATENT DOCUMENTS

| | | | |
|---|---|---|---|
| EP | 0 013 819 A1 | 12/1979 | |
| EP | 0 054 814 A1 | 12/1981 | |
| JP | 56005124 A261 * | 1/1981 | ............ 261/76 |
| WO | WO 79/00350 | 6/1979 | |

OTHER PUBLICATIONS

Montgomery Watson, Stage III-Odor/Corrosion/VOC Study High Purity Oxygen Field Test, for Modifications to the Metropolitan Sewerage System presented to City of San Diego, Jul. 1994.

Robert P.G. Bowker, Gerald A. Audibert, Hemang J. Shah, and Neil A. Webster, U.S. Envir. Prot. Agency Office of Wastewater Enforcement and Compliance, Detection, Control, and Correction of Hydrogen Sulfide Corrosion in Existing Wastewater Systems, Sep. 1992.

J.M. Brisbane, M. Ogston, R. Lloyd-Smith, Oxygen Injection-A New Perspective on a Well Established Technology, Sep. 2000.

* cited by examiner

SUPEROXYGENATION OF RAW WASTEWATER FOR ODOR/CORROSION CONTROL

CROSS REFERENCE TO RELATED APPLICATIONS

This is a non-provisional patent application filed based on U.S. provisional patent application Ser. No. 60/543,097, filed Feb. 9, 2004.

FIELD OF THE INVENTION

This invention relates to the field of wastewater collection and treatment, and particularly to the prevention of offensive odors and corrosion in sewage systems.

BACKGROUND OF THE INVENTION

Raw domestic wastewater commonly generates offensive odors, especially at warmer temperatures, in collection systems and primary clarifiers at the wastewater treatment plant, combined sewer overflows, storage tanks, lagoons, and effluents in a sewage system. The reason for generation of offensive odors is that the demand for dissolved oxygen by the microbes in the wastewater greatly exceeds the rate that dissolved oxygen is absorbed into the wastewater. The main odor source at a municipal wastewater treatment plant is the effluent of the primary clarifier. This is because the raw wastewater resides in the primary clarifier for over 1 to 4 hours under anaerobic conditions. Under these anaerobic conditions, the microbes reduce sulfate to sulfide which causes the offensive odors. Thus, when the effluent spills down the 2 to 24 inches over the effluent weirs, the hydrogen sulfide is readily stripped out of solution. Consequently, many municipalities cover their primary clarifiers, pull off the foul off gas and scrub it of the offensive odors. This solution results in high capital cost, as well as high operating costs.

Even though it is widely recognized that oxygen deficiency in the wastewater is the root cause of the malodorous and corrosive condition, providing sufficient dissolved oxygen has not been possible, because the rags and stringy material in the raw wastewater quickly plug conventional gas transfer equipment. Furthermore, the low oxygen content in air (21%) makes it impossible to raise the dissolved oxygen above 9 mg per liter in wastewater at 25° C. Furthermore, conventional aeration systems are very efficient at stripping out the volatile offensive sulfide complements. For instance, coarse bubble aerators generate 99 ft.$^3$ of off gas for each 1 ft.$^3$ of oxygen dissolved at 5% oxygen absorbed efficiency characteristic of coarse bubble aerators. Surface aerators have even greater stripping potential for sulfide. Therefore, these conventional systems cannot be used to aerate raw domestic wastewater without exacerbating the odors.

In order to prevent odor and corrosion in collection and primary clarifiers, it has been found that wastewater should be superoxygenated from about 10 mg per liter to about 60 mg per liter or higher of dissolved oxygen. There is a widespread myth that (1) it is not possible to achieve such high dissolved oxygen concentrations in raw municipal wastewater, and (2) that if such levels were achieved, they would quickly effervesce out of solution from the wastewater. High purity oxygen ("HPO") has a water saturation concentration about five times that of air (40 mg per liter at 25° C.). Furthermore, HPO is expensive, and economic considerations make it preferable to utilize an oxygen dissolving system that is highly efficient and has low unit energy consumption per ton of dissolved oxygen.

The only attempts to use high purity oxygen for odor and corrosion prevention in raw municipal wastewater for gravity sewers, primary clarifiers, collection sewage overflows, tanks and lagoons have used gaseous oxygen injection from a diffuser in the inlet piping. However, the applications of this method have resulted in only 40% oxygen absorption. This makes the process uneconomical, and creates an explosion hazard with such high purity oxygen in a confined space. It has thus been considered that only liquid alternative oxidants, such as hydrogen peroxide and nitrate salts and chlorine and ferric salts to precipitate sulfide, can be used for odor/corrosion prevention in collection systems and primary clarifiers at the treatment plant. These alternative oxidants cost over ten times as much as high purity oxygen, making them a less economic alternative, but these oxidants are an alternative that is used in the current absence of efficient superoxygenation techniques. This problem, coupled with the plugging problems of rags and strings, have presented such monumental problems that not one single installation in the United States is known to efficiently superoxygenate raw municipal wastewater prior to gravity sewers, primary clarifiers, or combined sewer overflows to a level of 10 to 60 mg per liter of dissolved oxygen or higher for odor and corrosion control.

Thus, large cities in the southern part of the United States spend considerable amounts for odor/corrosion control chemicals. For example, Los Angeles County spends nearly twenty (20) million dollars per year on the chemicals alone. Orange County Calif. spends about 2.5 million dollars per year for odor control chemicals such as peroxide and nitrate. Some cities inject gaseous high purity oxygen into force mains, but the low efficiency of oxygen absorption considerably increases the total cost, as well as presents an explosion hazard, because the high purity oxygen bubbles immediately rise out of the wastewater and the high purity oxygen travels along the crown of the sewer and then collects at the first high point when the grade of the pipe becomes negative. This gas space also increases the head on the pump moving water through the system. Therefore, no efficient method of superoxygenating raw municipal wastewater prior to gravity sewers, primary clarifiers, or combined sewer overflows is in use in the art, resulting in the use of costly chemicals to achieve acceptable results. Therefore, a high efficiency method and apparatus for superoxygenating raw wastewater would be beneficial.

Oxygenation has long been recognized as potentially attractive in wastewater operations. However, to make an oxygenation system economically competitive, there should be commensurate savings in energy costs for dissolving the oxygen to offset the costs for the HPO supply. Early oxygenation systems were not able to achieve significant energy reductions for they consumed about half the energy needed to dissolve a unit of oxygen compared to conventional aeration systems.

Municipal wastewater treatment plants themselves can generate offensive odors—with $H_2S$ and mercaptans being perhaps the worst offenders. Odor studies identify the effluent weirs from the primary clarifier as the major source of odor generation for municipal wastewater treatment plants. The root cause for the odor lies in the long detention times of raw wastewater and sludge in the primary clarifier in the absence of D.O.

One prior art approach taken to mitigate such offensive odors at the municipal wastewater treatment plan is to cover the primary clarifier weirs, where the odor is stripped from the primary effluent as it cascades over the effluent weirs, and to withdraw the gas under the cover through ductwork and a blower. This withdrawn gas then must be passed through a caustic chlorine scrubber or biofilter where the odor is oxidized and destroyed. Treatment of the offensive gas in this manner is costly in terms of capital cost as well as the operating costs for caustic and chlorine. Because $H_2S$ is so corrosive the cover and ductwork must be made of corrosion proof material.

Another common approach to mitigating the odor at a wastewater treatment plant is to capture and treat the offensive gases so formed. However, the use of covers on the clarifier or weirs also significantly hinder maintenance. Furthermore, every pound of oxygen consumed in the primary clarifier translates to a 1:1 corresponding reduction of oxygen demand in the aeration tank. Therefore, it is desired to provide an efficient, cost effective system for removal of odors at municipal wastewater treatment plants and at clarifiers.

A major effort is underway in many cities to collect, store and treat combined sewer overflows (CSO). Such systems generally involve the collection of a relatively large volume of CSO in a short period of time and then storing the collected CSO for a protracted period of time—a period of days to weeks—while it is pumped out through a municipal wastewater treatment plant during low flow periods. The very nature of CSO is that it can be significantly polluted in the initial "flush" with BOD concentrations of 50 to over 200 mg/L.

The challenge to meet this oxygen demand for collected CSO is significant with present aeration systems. Further, some particular design considerations emerge. Aeration does not economically permit D.O. increases above 2 to 4 mg/L. In one large Midwestern city, the proposed aeration system designed to keep the stored CSO aerobic consumed from 2000 to 4000 kwhr/ton of $O_2$ dissolved under the most frequently occurring storage event. Furthermore, the electrical demand charge for the compressors to be turned on for a 30-minute interval twice per year alone is excessive.

If a storage basin receives a CSO storm event flow containing a BOD of 100 mg/L which has a deoxygenation constant, $k_1$, of 0.1 per day. The D.O. uptake for the first day in this case is 21 mg/L. Because the first day is the highest rate, it establishes the design criteria for sizing the required oxygen transfer system. For a storage basin of 100 MG, the system would require approximately a 700 HP blower for coarse bubble aeration to meet this demand. Therefore, it is desire to provide an aeration system for use with collected CSOs that does not require significant capital investment to achieve appropriate levels of D.O.

Wastewater treatment lagoons commonly are utilized for treatment of industrial and intensive animal rearing wastewaters. However, because these lagoons are commonly anaerobic and generate considerable $H_2S$, it is not unusual to require $1,000,000 to put a cover on such lagoons and treat the off-gas to mitigate odor generation.

Traditionally, aeration systems have been designed to satisfy activated sludge and aerated lagoon D.O. uptake rates of 20 to 80 mg/L-hr. The development of some of the more advanced aerobic treatment systems which use advanced cell immobilization techniques are capable of ten-fold increases in biomass concentrations. Only a properly designed oxygenation system can meet the exceptionally high oxygen uptake rates of 300 to 500 mg/L-hr inherent in these advanced aerobic processes. It is desired to provide such an oxygenation system.

Regulations requiring that treated effluents be discharged at elevated D.O. concentrations to their receiving waters are specified in some discharge permits. Conventional aeration techniques can achieve this, but do so with by requiring prohibitively high unit energy consumption and are also limited in the D.O. that can be achieved. To increase the D.O. from 0 to 7 mg/L in water at 25° C. requires approximately 2700 kwhr/ton of D.O. added using standard aeration equipment. This is equivalent to over $200/ton of D.O. for electricity rates of $0.08/kwhr. It is therefore desired to provide an aeration system that can be utilized to treat effluents to regulated levels in an energy efficient manner.

BRIEF SUMMARY OF THE INVENTION

The present invention comprises a system and method for treating sewage. The system of the present invention is utilized to treat the main sewage stream or a side stream and results in high oxygen absorption in an energy efficient manner. The method of the present invention involves the use of the system of the present invention to oxygenate either the main sewage stream or a sidestream subsequently reintroduced into the main sewage stream.

In one embodiment, the system comprises a sewage inlet comprising part of the sewage system. The inlet is positioned for receipt and flow of sewage therethrough and has a first end and a second end. The system also comprises a sewage outlet which also comprises part of the sewage system. The outlet is positioned for flow and discharge of sewage therethrough. Additional components of the system include a source of high purity oxygen and an oxygenator. The source of high purity oxygen is operably connected to the sewage inlet between the first and second ends of the sewage inlet and is capable of introducing high purity oxygen into the sewage inlet. The oxygenator has an inlet and an outlet with an inverse conically shaped portion therebetween. The inlet of the oxygenator is operably connected to the second end of the sewage inlet, and the outlet of the oxygenator is operably connected to the first end of the sewage outlet. The inverse conically shaped portion of the oxygenator encourages downflow of oxygen gas including the sewage provided to the oxygenator, such that sewage discharged by the sewage outlet is oxygenated.

In another embodiment of the system of the present invention, connectors having apertures therethrough are connected to a main sewage line, and a pump is position near the first connected to pull a portion of the sewage flowing through the main sewage line into the previously described system.

According to one embodiment of the method of the present invention, a system according to the present invention is provided. Sewage is then allowed to enter the sewage inlet and oxygen gas is introduced from the source of high purity oxygen into the sewage inlet.

DETAILED DESCRIPTION OF THE INVENTION

Figure 1:
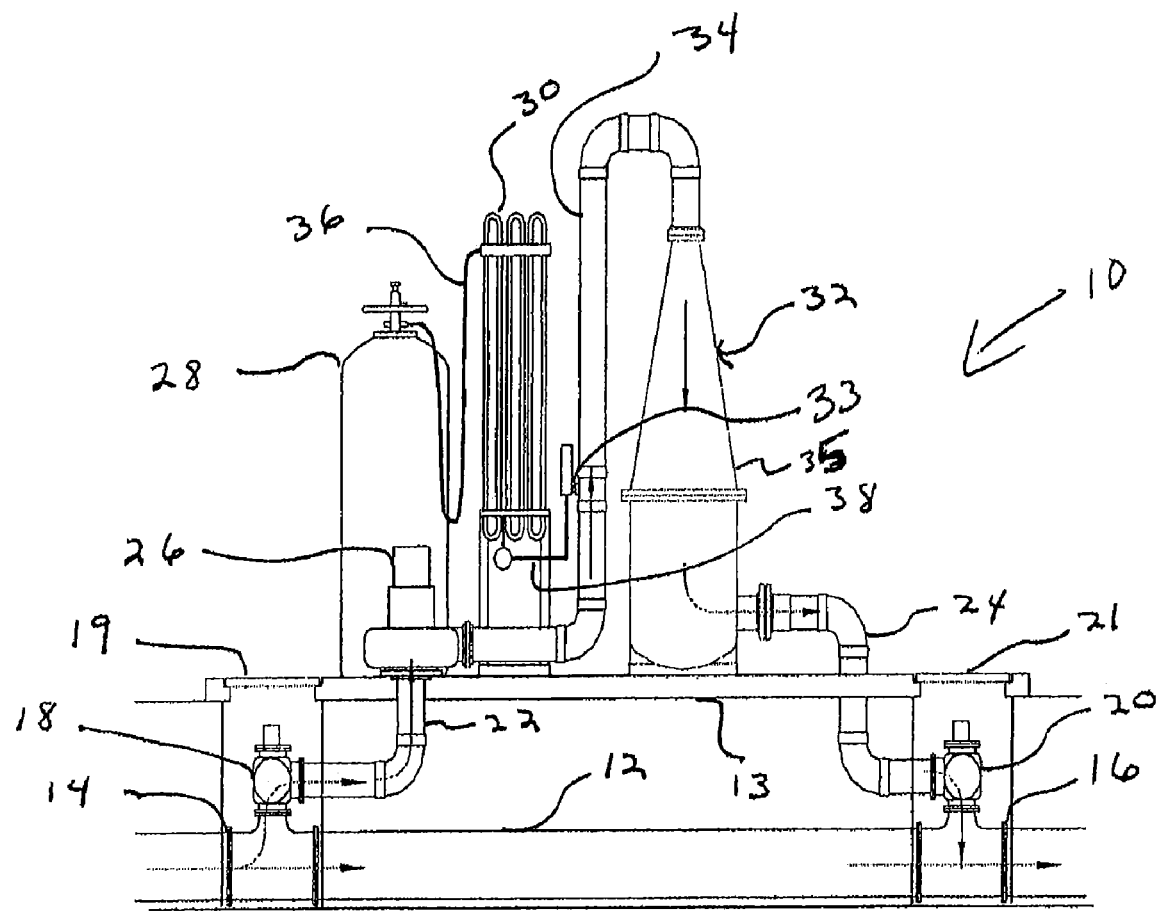
FIG. 1 shows a schematic view of one embodiment of the wastewater treatment system of the present invention.

The present invention relates to a process and apparatus that allows municipal waste treatment facilities to inhibit corrosive and malodorous chemicals from forming in its gravity collection systems, primary clarifiers, or combined sewer overflows in a sewage system by readily superoxygenating the wastewater to effective levels. In particular, the present invention utilizes a down flow bubble contact oxygenator, which has no internal edges, corners or cracks to snag rags and strings and plug the system. In one embodiment, the down flow bubble contact oxygenator, substantially similar to that disclosed in this inventor's U.S. Pat. No. 3,643, 403 that is hereby incorporated by reference, is used to pump raw municipal wastewater through it, along with gaseous $O_2$ injection into the chamber to superoxygenate it to 10 mg per liter of dissolved oxygen or higher. In particular, the down flow bubble contact oxygenator is utilized in gravity sewers, primary clarifiers, or combined sewer overflows in a sewage system to superoxygenate wastewater.

According to the present invention, oxygen is completely dissolved in the wastewater in the discharge of the down flow bubble contact oxygenator and is then piped back into the sewage system. For example, by use of the present invention with a six-foot by six-foot square sewer flowing 5 ft. deep, the wastewater can be superoxygenated to 30 mg per liter dissolved oxygen, and only lose about 3 mg per liter of dissolved oxygen after flowing 3 miles in a gravity sewer due to gas exchange at the surface. Since the oxygen is in the dissolved state in the discharge of the down flow bubble contact oxygenator, there are no gaseous bubbles to come out of solution once the water is returned to the collection system or pumped into the primary clarifier. Thus, any hydrogen sulfide flowing into the superoxygenated section is microbially oxidized to sulfate in about 15 to 30 minutes once the wastewater has a positive dissolved oxygen, and no further sulfide production occurs in this three-mile stretch because the dissolved oxygen prevents any further sulfate reduction to hydrogen sulfide.

Wastewater in the interceptors flowing into the head works of a wastewater treatment plant superoxygenated in the manner described above eliminate the great odor and corrosion problems experienced at most wastewater treatment plants due to hydrogen sulfide in the incoming wastewater. Advantages are also realized in other applications of the system of the present invention at various locations in the sewage system.

The system and method of the present invention results in precluding the formation of corrosive and odorous gas at a lower cost (capital investment and energy) with highly efficient oxygen absorption and higher superoxygenated D.O. concentrations than any of the prior art systems. There are also additional benefits to the use of this superoxygenating system according to the present invention. For example, each pound of dissolved oxygen added to the stream of sewage by the system results in 1 lb. of dissolved oxygen saved in secondary treatment. Thus, corrosion control is achieved for no net overall increase in dissolved oxygen as required in secondary treatment. Another significant advantage of the system utilizing the down flow bubble contact oxygenator is the high efficiency of dissolving oxygen results in no off gas stripping of any volatile components in the wastewater. Thus, wastewater containing high concentrations of hydrogen sulfide can be superoxygenated without exacerbating the odor corrosion problem, by stripping it out of solution. Additionally, under the conditions created under the use of this system, there is no need to cover the holding tanks because there is no hydrogen sulfide in the discharge of this toxic wastewater.

Use of a down flow bubble contact aeration apparatus to superoxygenate wastewater in a sewage system, superoxygenates the water to a level which precludes the formation of malodorous and corrosive gases and chemicals. In particular, the use of a down flow bubble contact oxygenator allows superoxygenation of wastewater to an extent not possible under the prior art, greatly reducing stripping of gases and similarly resisting clogging by rags and string endemic to raw wastewater.

Referring now to FIG. 1, there is shown a schematic view of one embodiment of the wastewater treatment system of the present invention. As shown, main sewage line 12 is disposed below ground. System 10 may be disposed above or below main sewage line 12. In the embodiment of FIG. 1, system 10 is above platform 13 as would be case in use with a primary clarifier, for example. If system 10 were used with a gravity sewer, system 10 intake and discharge would be below main sewage line 12. First and second sewer connections 14 and 16, respectively, each comprise an aperture and are made to permit sewage flow to and from system 10. First valve 18 is disposed at first sewer connection 14, and second valve 20 is disposed at second sewer connection 16. First and second valves 18 and 20 are accessible through first and second manhole covers 19 and 21, respectively, on platform 13.

Both first valve 18 and second valve 20 are movable between an open position and a closed position. When first valve 18 is in the closed position, all sewage entering first sewer connection 14 is caused to flow through main sewage line 12. When first valve 18 is in the open position, a portion of sewage entering first sewer connection 14 is permitted to flow through system inlet 22. When second valve 20 is in the closed position, any sewage residing in system outlet 24 is not permitted to enter into main sewage line 12. When second valve 20 is in the open position, any sewage residing in system outlet 24 is permitted to enter into sewage line 12.

In this embodiment, system 10 includes system inlet 22, pump 26, liquid oxygen tank 28, evaporator 30, oxygenator 32, system outlet 24, liquid oxygen connector 36, oxygen gas connector 38, and oxygenator inlet 34. System inlet is connected at its first end to first valve 18, and at its second end to pump 26. Pump 26 is operable to "pull" sewage from system inlet 22 into oxygenator inlet 34. Liquid oxygen tank 28 houses liquid oxygen and evaporator 30 converts liquid oxygen into oxygen gas. Liquid oxygen connector 36 is connected at its first end to liquid oxygen tank 28 and at is second end to evaporator 30. Oxygen gas connector 38 is connected at its first end to evaporator 30 and at its second end to oxygen inlet 33 along oxygenator inlet 34. Oxygenator inlet 34 is connected at its first end to pump 26 and at its second end at oxygenator 32.

In this embodiment, oxygenator 32 is of the shape disclosed in U.S. Pat. No. 3,643,403. However, unlike the embodiments illustrated in U.S. Pat. No. 3,643,403, oxygen is not directly inserted within the interior of oxygenator 32. Instead, as explained herein, according to the present invention, oxygen is injected through oxygen inlet 33 into oxygenator inlet 34 and then into oxygenator 32. However, like the embodiments illustrated in U.S. Pat. No. 3,643,403, oxygenator 32 comprises a flow chamber of uniformly increasing flow area in a downward direction, i.e., comprises conical portion 35. Oxygenator 32 may, or may not, include a power operator impeller means as disclosed in U.S. Pat. No. 3,643,403.

As shown in FIG. 1, the oxygenator comprising a container having an inverse conically shaped portion having a first end and a second end, a cylindrical portion having a first end attached to the second end of the inverse conically shaped portion and a second closed end, an inlet at the first end of the inverse conically shaped portion, and an outlet extending perpendicularly from the cylindrical portion and spaced apart from the second closed end. The oxygenator inlet, the inverse conically shaped portion, and the cylindrical portion coaxially surround a vertical axis and the oxygenator outlet extends perpendicular to the vertical axis. The oxygenator inlet and the oxygenator outlet have a first diameter. The first end of the inverse conically shaped portion also has the first diameter. The second end of the inverse conically shaped portion and the cylindrical portion have a second diameter. The inlet of the oxygenator is operably connected to the second end of the raw sewage inlet and the outlet of the oxygenator is operably connected to the first end of the sewage outlet, such that the combination of sewage and oxygen gas collected in the raw sewage inlet is introduced to the oxygenator through the oxygenator inlet, flows through the oxygenator to the oxygenator outlet and through the sewage outlet, thereby discharging oxygenated sewage containing dissolved oxygen from the oxygenator. The first diameter of the oxygenator inlet and the oxygenator outlet and the first end of the inverse conically shaped portion of the oxygenator is smaller than the second diameter of the second end of the inverse conically shaped portion and the cylindrical portion of the oxygenator.

During operation of system 10, first and second valves 18 and 20, respectively, are placed in the open position to allow a portion of sewage entering main sewage line 12 at first sewer connection 14 to enter system 10 and then to rejoin main sewage line 12 at second sewer connection 16. Pump 22 is operated to "pull" the portion of sewage entering through first valve 18 through system inlet 22 and to push the portion of sewage into oxygenator inlet 34. Liquid oxygen is allowed to flow (due to the pressure in liquid oxygen tank 28) from liquid oxygen tank 28 through liquid oxygen connector 36 into evaporator 30. At evaporator 30, the liquid oxygen is converted to oxygen gas an allowed to flow (due to the pressure in liquid oxygen tank 28) through oxygen gas connector 38 into oxygenator inlet 34 via oxygen inlet 33.

From the point of oxygen inlet 33 to oxygenator 32 along oxygenator inlet 34, oxygen gas injected at oxygen inlet mixes with the sewage flowing through oxygenator inlet 34. The mixture of sewage and oxygen gas enters oxygenator 32. At oxygenator 32, the bubbles of oxygen gas mixed with the sewage are drawn downward toward the bottom of oxygenator 32 and system outlet 24. Thus, the mixture of sewage flowing through system outlet 24 and second valve 20 into main sewage line 12 at second sewer connection 16 is "superoxygenated". At second sewer connection 16, the superoxygenated mixture joins the portion of sewage that was not drawn into system 10 to oxygenate the entire sewage flowing away from system 10.

It will be appreciated by those of skill in the art that the source of oxygen gas inserted into oxygenator input 34 need not be from liquid oxygen. Instead, oxygen gas itself may be used and be within the scope of the invention. For example, the combination of liquid oxygen tank 27, liquid oxygen connector 36, evaporator 30, and oxygen gas connector 38 may be replaced with a tank of oxygen gas and a connector going from the tank of oxygen gas and oxygen inlet 33.

It will also be appreciated that the system of the present invention may be useful in a variety of applications in a sewage system. While the embodiment of FIG. 1 illustrated an embodiment of the system used with a gravity main, the system may also be used with wastewater treatment plants, clarifiers, and combined sewer overflows prior to discharge into receiving waters, such as rivers.

It will be further appreciated that the system of the present invention may be used in the main sewage stream. An alternate embodiment of the present invention introduces the oxygen directly into the main stream rather than a sidestream as illustrated in FIG. 1.

The present invention provides a relatively simple technology to result in efficient dissolution of HPO into raw sewage. The performance of the oxygenation system is, of course, related to the pressure in the superoxygenation transfer vessel, which in FIG. 1 comprises oxygenator 32. For example, a backpressure of 15 psig would permit 100% $O_2$ absorption in the oxygenation system while producing a discharge D.O. of approximately 50 mg/L. The corresponding maximum discharge D.O. for a backpressure of 45 psig would be 150 mg/L. For example, a 6 ft×6 ft sewer flowing 5 ft deep at 3 ft/sec has a reaeration rate ($k_2$) of about 10/day. Therefore, if the D.O. is raised to 30 mg/L, it can be 86% retained over 3 miles and the head space oxygen content will only rise to a maximum of 22.5% $O_2$.

Superoxygenation by use of the present invention with primary clarifier influents provides a major advance in odor mitigation technology. The method of prevention of $H_2S$ formation by use of the system of the present invention is a much more comprehensive solution to municipal and industrial wastewater treatment plant odors than is gas scrubbing of the $H_2S$ after it is formed or collection of the gas after it is formed.

With regard to combined sewer overflows, oxygenation by use of the present invention is considerably more cost effective than prior art aeration systems. In addition, there are some noteworthy design objectives which can only be achieved with oxygenation by the present invention. Liquid oxygen stored on-site can be utilized to meet the exceptionally high initial oxygen demand of a storm event. Oxygenation by the present invention makes it possible to increase the D.O. in the incoming flows to over 50 mg/L. Since the rate of exchange of a dissolved gas at the interface ($k_2$) of a storage basin is related to the velocity of the water and wind and inversely proportional to the depth, very little of the superoxygenated D.O. is lost in a stagnant storage basin containing over 10 ft of water. Thus, the super oxygenated D.O. can be kept in solution until it is consumed by the microbiota.

A design was prepared using the present invention for a large Midwestern city which routed the peak CSO flow through the oxygenator of the present invention. This design raised the D.O. in the CSO to 40 mg/L. as it entered the storage basin. The raising of the D.O. forestalls $H_2S$ generation by providing sufficient D.O. to meet the microbial demand for over 2 days without the need for further oxygen supplementation.

If, for some reason, the D.O. becomes depleted from a CSO storage basin with conventional aeration systems, such as may occur by waiting too long to turn on the aeration system, $H_2S$ accumulates. The accumulated $H_2S$ is generally stripped from the water into the air by conventional aeration systems. However, with use of the system of the present invention, the negligible off-gas stripping potential reduces noxious gas stripping accordingly and eliminates the problem of oxygen transfer into septic wastewater.

As previously stated herein wastewater treatment lagoons commonly are utilized for treatment of industrial and intensive animal rearing wastewaters, but because these lagoons are commonly anaerobic and generate considerable $H_2S$, it is not unusual to require $1,000,000 to put a cover on such lagoons and treat the off-gas to mitigate odor generation. In contrast a properly designed oxygenation system according to the present invention can withdraw a sidestream of the supernatant overlying the anaerobic sludge deposits, add 50 to 100 mg/L of D.O., and return it to the supernatant without disturbing the sludge layer. Using such improved technology it is possible to maintain greater than 10 mg/L of D.O. in the entire supernatant layer, with minimal loss of oxygen to the atmosphere because the aeration rate of stagnant lagoon surfaces is relatively low. Such elevated D.O. concentrations can successfully prevent $H_2S$ formation in the supernatant and also effectively oxidize the low rates of $H_2S$ evolution from the sludge layer.

Traditionally, prior art aeration systems have been designed to satisfy aerated lagoon D.O. uptake rates of 20 to 80 mg/L-hr. The development of some of the more advanced aerobic treatment systems which use advanced cell immobilization techniques are capable of ten-fold increases in biomass concentrations. Only a properly designed oxygenation system, such as the system of the present invention, can meet the exceptionally high oxygen uptake rates of 300 to 500 mg/L-hr inherent in these advanced aerobic processes.

While some prior art systems treat sewage at various points in the sewage system, such prior art systems are not as efficient and effective as the present invention. The present invention is very efficient as over 90% of oxygen gas is absorbed into the sewage stream and very high concentrations of dissolved oxygen are achieved in the sewage discharge. Other advantages of the present invention include: (a) minimization of the stripping of dissolved nitrogen from the sewage when using HPO; and (b) superoxygenation of a side stream initially rather than attempting to aerate the whole wastewater stream. Sometimes 50 to 100 mg/L supersaturation is required to accommodate high accumulative oxygen consumption. Highly superoxygenated side streams incorporated into the HPO treatment design of the present invention proportionately reduce the footprint of oxygen transfer systems as well as allow one time high D.O. additions allowing greater zones of influence in a gravity sewer. For satisfactory prevention of $H_2S$ only a few mg/L of D.O. in excess of the amount consumed in transit need be maintained. This is especially suited to odor/corrosion issues in gravity sewers, primary clarifiers, and combined sewer overflows. For instance, a gravity main superoxygenator can be pressurized to about 40 ft by a pump to superoxygenate the raw sewage to about 70 mg/L D.O. easily and effectively while still keeping the D.O. in solution.

The present invention is also operable to achieve four important characteristics for high oxic conditions in wastewater and storm water conveyance systems. These characteristics include: (a) at least 85% (for example, 90%) efficient oxygen absorption; (b) less than 400 kwhr/ton D.O. low unit energy consumption, and at least less than 1,000 kwhr of energy consumption per ton of D.O.; (c) at least 10 mg/L D.O. levels of superoxygenation (for example, 50 to 100 mg/L D.O. superoxygenation of the sidestream); and (d) effective retention of high D.O. concentrations in solution throughout treatment.

As set forth herein, the present invention has a myriad of applications in treatment of sewage. These include: (a) combating $H_2S$ formation in gravity sewers; (b) maintenance of aerobic conditions throughout the primary clarifier for odor control; (c) maintenance of aerobic conditions in combined sewer overflow (CSO) storage tunnels and basins; and (d) achieving D.O. uptake rates of greater than 300 mg/L-hr in advanced aerobic processes with mixed liquor suspended solids (MLVSS) concentrations exceeding 20,000 mg/L volatile suspended solids (VSS).

In view of the many possible embodiments to which the principles of these invention may be applied, it should be recognized that the detailed embodiments are illustrative only and should not be taken as limiting the scope of the invention. Rather, the invention comprises all such embodiments as may come within the scope and spirit of the invention and equivalents thereto.

I claim:

1. A wastewater treatment system, comprising:
a raw sewage source for flow of sewage therethrough, the raw sewage source having an inlet and an outlet;
a raw sewage inlet for receipt and flow of sewage therethrough, the sewage inlet having a first end and a second end, the first end of the raw sewage inlet in fluid communication with the raw sewage source;
a sewage outlet for flow and discharge of oxygenated sewage therethrough, the sewage outlet having a first end and a second end, the second end of the sewage outlet in fluid communication with the raw sewage source;
a source of high purity oxygen operably connected to the raw sewage inlet between the first and second ends of the raw sewage inlet to permit oxygen gas from the source to be introduced to the raw sewage inlet; and
an oxygenator, the oxygenator comprising a container comprising an inverse conically shaped portion having a first end and a second end, a cylindrical portion having a first end attached to the second end of the inverse conically shaped portion and a second closed end, an inlet at the first end of the inverse conically shaped portion, and an outlet extending perpendicularly from the cylindrical portion and spaced apart from the second closed end, the oxygenator inlet, the inverse conically shared portion, and the cylindrical portion coaxially surrounding a vertical axis and the oxygenator outlet extending perpendicular to the vertical axis, the oxygenator inlet and the oxygenator outlet having a first diameter, the first end of the inverse conically shaped portion having said first diameter, the second end of the inverse conically shaped portion and the cylindrical portion having a second diameter, and the inlet of the oxygenator operably connected to the second end of the raw sewage inlet and the outlet of the oxygenator operably connected to the first end of the sewage outlet, such that the combination of sewage and oxygen gas collected in the raw sewage inlet is introduced to the oxygenator through the oxygenator inlet, flows through the oxygenator to the oxygenator outlet and through the sewage outlet, thereby discharging oxygenated sewage containing dissolved oxygen from the oxygenator;
wherein the first diameter of the oxygenator inlet and the oxygenator outlet and the first end of the inverse conically shaped portion of the oxygenator is smaller than the second diameter of the second end of the inverse conically shaped portion and the cylindrical portion of the oxygenator.

2. The system of claim 1, wherein the oxygenator is configured to be operable to convert sewage introduced to the oxygenator through the oxygenator inlet into oxygenated sewage containing at least about 10 mg/L of dissolved oxygen.

3. The system of claim 1, wherein the oxygenator is configured to be operable to cause at least about 85% of the oxygen gas to be dissolved into the oxygenated sewage.

4. The system of claim 1, wherein the system is configured to consume less than about 1,000 kwhr per ton of dissolved oxygen during system operation.

5. A wastewater treatment system comprising:
a sewage line having a first end and a second end;
a first sewage connection comprising an aperture and located proximate to the first end of the sewage line;
a second sewage connection comprising an aperture and located proximate to the second end of the sewage line;
a pump operably connected to the first sewage connection for pulling a portion of sewage flowing through the sewage line through the aperture of the first sewage connection;
a sewage inlet for receipt and flow of sewage therethrough, the sewage inlet having a first end and a second end, the first end of the sewage inlet operably connected to the pump;
a sewage outlet for flow and discharge of oxygenated sewage therethrough, the sewage outlet having a first end and a second end, and the second end of the sewage outlet operably connected to the aperture of the second sewage connection;

a source of high purity oxygen operably connected to the sewage inlet between the first and second ends of the sewage inlet to permit oxygen gas from the source to be introduced to the sewage inlet; and an oxygenator, the oxygenator comprising a container comprising an inverse conically-shaped portion, a cylindrical portion, an inlet, and an outlet, the inlet and the outlet having a first diameter, the inverse conically shaped portion comprising a first end having said first diameter and a second end having a second diameter, the cylindrical portion having said second diameter and a first end connected to the second end of the inverse-shaped conical portion and a second closed end, and the inlet of the oxygenator operably connected to the second end of the sewage inlet and the outlet of the oxygenator extending perpendicularly from the cylindrical portion and spaced apart from the second closed end and being operably connected to the first end of the sewage outlet, the inverse conical portion, the cylindrical portion, and the oxygenator inlet coaxially surrounding a vertical axis and the oxygenator outlet extending perpendicular to the vertical axis such that the combination of sewage and oxygen gas collected in the sewage inlet is introduced to the oxygenator through the oxygenator inlet, flows through the oxygenator to the oxygenator outlet and through the sewage outlet, thereby discharging oxygenated sewage containing dissolved oxygen from the oxygenator;

wherein the first diameter of the oxygenator inlet and the oxygenator outlet and the inverse conically shaped portion of the oxygenator is smaller than the second diameter of the second end of the inverse conically shaped portion and the cylindrical portion of the oxygenator.

6. The system of claim 5, wherein the oxygenator is configured to be operable to convert sewage introduced to the oxygenator through the oxygenator inlet into oxygenated sewage containing at least about 10 mg/L of dissolved oxygen.

7. The system of claim 5, wherein the oxygenator is configured to be operable to cause at least about 85% of the oxygen gas to be dissolved into the oxygenated sewage.

8. The system of claim 5, wherein the system is configured to consume less than about 1,000 kwhr per ton of dissolved oxygen during system operation.

9. A wastewater treatment system, comprising:

a raw sewage source for flow of sewage therethrough, the raw sewage source having an inlet and an outlet;

a sewage inlet for receipt and flow of sewage therethrough, the sewage inlet having a first end and a second end, the first end of the raw sewage inlet in fluid communication with the raw sewage source;

a sewage outlet for flow and discharge of oxygenated sewage therethrough, the sewage outlet having a first end and a second end, the second end of the sewage outlet in fluid communication with the raw sewage source;

an oxygenator, the oxygenator comprising a container comprising an inverse conically shaped portion having a first end and a second end, a cylindrical portion having a first end attached to the second end of the inverse conically shared portion and a second closed end, an inlet at the first end of the inverse conically shaped portion, and an outlet extending perpendicularly from the cylindrical portion and spaced apart from the second closed end, the oxygenator inlet, the inverse conically shaped portion, and the cylindrical portion coaxially surrounding a vertical axis and the oxygenator outlet extending perpendicular to the vertical axis, the oxygenator inlet and the oxygenator outlet having a first diameter, the first end of the inverse conically shaped portion having said first diameter, the second end of the inverse conically shaped portion and the cylindrical portion having a second diameter, the inlet of the oxygenator operably connected to the second end of the sewage inlet, and the outlet of the oxygenator operably connected to the first end of the sewage outlet; and a source of oxygen in communication with the oxygenator;

wherein the source of oxygen is capable of permitting oxygen gas from the source to be introduced into the oxygenator and the combination of sewage and oxygen gas flows through the oxygenator to the oxygenator outlet and through the sewage outlet, thereby discharging oxygenated sewage containing dissolved oxygen from the oxygenator; and wherein the first diameter of the oxygenator inlet and the oxygenator outlet and of the first end of the inverse conically shaped portion of the oxygenator is smaller than the second diameter of the second end of the inverse conically shaped portion and the cylindrical portion of the oxygenator.

10. The wastewater treatment system of claim 1, wherein the oxygenator is positioned so as to allow sewage within the oxygenator to flow in a substantially downward direction.

* * * * *